United States Patent
Ishida

(10) Patent No.: US 12,420,180 B2
(45) Date of Patent: Sep. 23, 2025

(54) SERVER DEVICE AND EVENT DATA PROCESSING METHOD

(71) Applicant: SONY INTERACTIVE ENTERTAINMENT INC., Tokyo (JP)

(72) Inventor: Takayuki Ishida, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 281 days.

(21) Appl. No.: 18/027,972

(22) PCT Filed: Oct. 5, 2021

(86) PCT No.: PCT/JP2021/036744
§ 371 (c)(1),
(2) Date: Mar. 23, 2023

(87) PCT Pub. No.: WO2022/080176
PCT Pub. Date: Apr. 21, 2022

(65) Prior Publication Data
US 2023/0364506 A1    Nov. 16, 2023

(30) Foreign Application Priority Data
Oct. 12, 2020  (JP) ................ 2020-172150

(51) Int. Cl.
*A63F 13/35*     (2014.01)
*A63F 13/798*    (2014.01)

(52) U.S. Cl.
CPC ............ *A63F 13/35* (2014.09); *A63F 13/798* (2014.09)

(58) Field of Classification Search
CPC ........ A63F 13/35; A63F 13/798; A63F 13/46; A63F 13/79; G06Q 50/10
(Continued)

(56) References Cited

U.S. PATENT DOCUMENTS

2003/0158827 A1* 8/2003 Ansari ................. A63F 13/10
348/E5.006
2006/0121990 A1* 6/2006 O'Kelley, II .......... A63F 13/35
463/42

(Continued)

FOREIGN PATENT DOCUMENTS

JP    2010154931 A    7/2010
JP    2011235182 A   11/2011

OTHER PUBLICATIONS

International Search Report and Written Opinion dated Dec. 21, 2021, from PCT/JP2021/036744, 8 sheets.

*Primary Examiner* — Michael A Cuff
(74) *Attorney, Agent, or Firm* — Kilpatrick Townsend & Stockton LLP

(57) ABSTRACT

A play time acquisition unit 212 acquires a play time of an activity by a plurality of players from event data indicating a start of the activity and event data indicating an end of the activity that are recorded in an event data recording unit 250. A distribution generation unit 222 divides the plurality of players who have executed the activity into a plurality of groups according to the play time. A class sorting unit 224 sorts a player into any one of a plurality of classes according to the skill value of the player. A percentage derivation unit 228 derives a percentage occupied by the players of each class in each of the plurality of groups. A type determination unit 230 determines the type of the activity on the basis of the derived percentage.

6 Claims, 13 Drawing Sheets

(58) Field of Classification Search
USPC .......................................................... 463/42
See application file for complete search history.

(56) References Cited

U.S. PATENT DOCUMENTS

| | | | | |
|---|---|---|---|---|
| 2007/0167226 A1* | 7/2007 | Kelly | .................... | G07F 17/32 |
| | | | | 463/29 |
| 2008/0153596 A1* | 6/2008 | Nguyen | ................. | A63F 13/12 |
| | | | | 463/42 |
| 2008/0256015 A1* | 10/2008 | Woolf | ..................... | A63F 13/67 |
| | | | | 706/48 |
| 2014/0274362 A1* | 9/2014 | Dhawan | ............... | A63F 13/798 |
| | | | | 463/29 |
| 2014/0297548 A1* | 10/2014 | Wilner | .............. | G06Q 10/1053 |
| | | | | 705/321 |

* cited by examiner

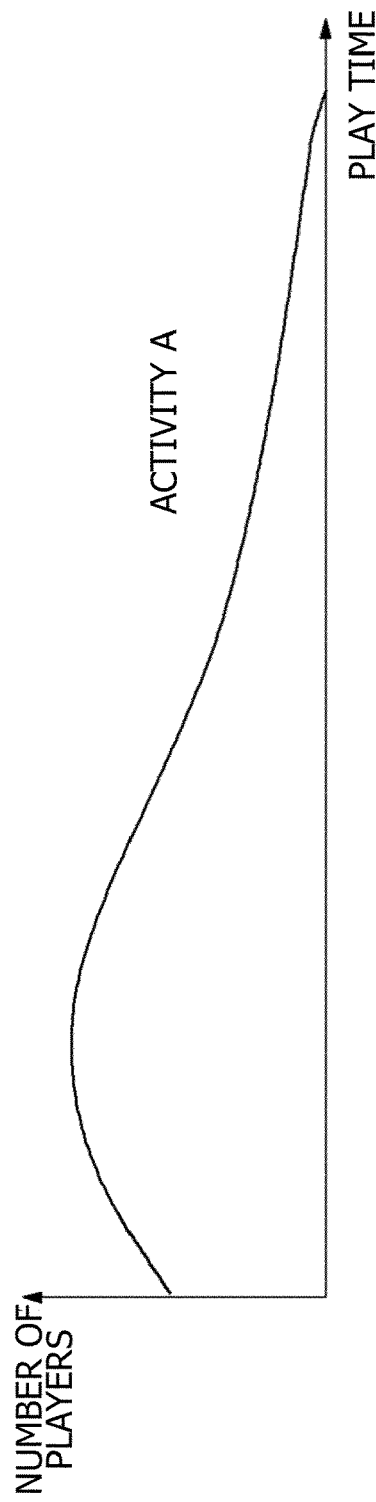
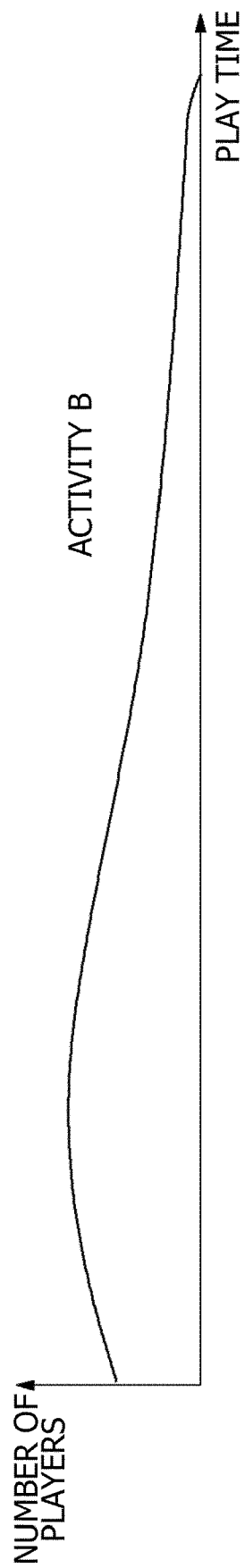
FIG. 7

FIG. 8
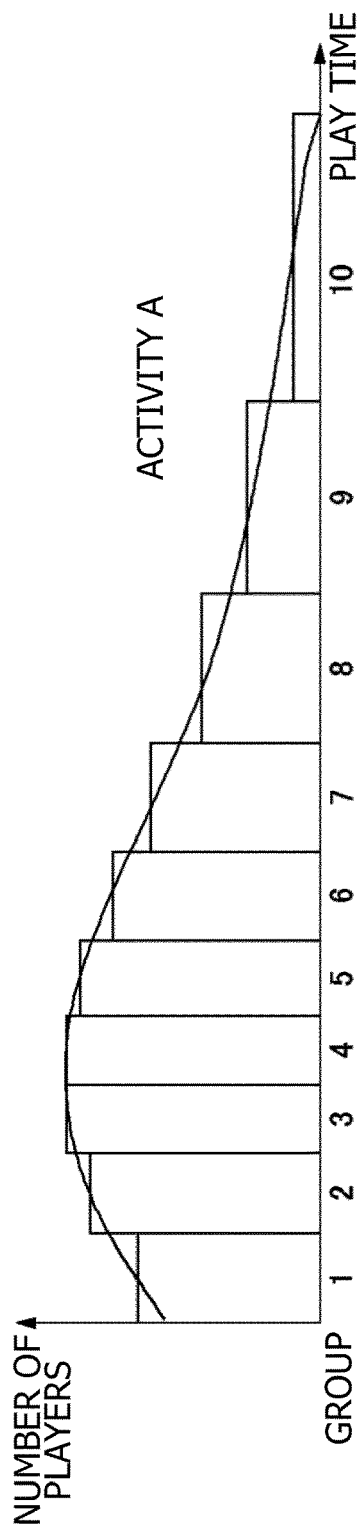
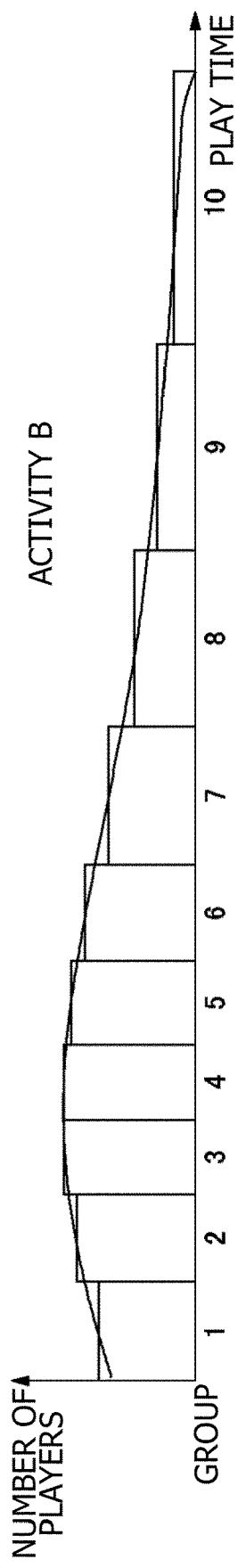

SERVER DEVICE AND EVENT DATA PROCESSING METHOD

TECHNICAL FIELD

The present invention relates to a technique for processing event data related to a game activity executed by a user.

BACKGROUND ART

In recent years, a cloud game service in which operation information input by a player is transmitted to a game server and the game server generates a video and voice of a game according to the operation information and transmits the same to a terminal device of the player has been widespread. In the cloud game service, the game server manages all the game plays, and thus a play status of an activity executed by the player can be analyzed to help improve game scenarios and the like.

On the other hand, current console games do not output information indicating the status of the game play to an outside, and thus the server side cannot analyze the play status by the player. Accordingly, it is preferable that various information related to the game play is transmitted to the server even in the console games and the server can analyze the play status of the activity.

SUMMARY

Technical Problem

The server collects the play statuses of the activity by a plurality of players, so that it is possible to statistically process a play time of the activity. Accordingly, it has been desired to build a mechanism for providing users who have not yet executed the activity with useful information related to the play time.

Accordingly, an object of the present invention is to realize a mechanism for providing information related to the play time of an activity.

Solution to Problem

In order to solve the above problem, according to an aspect of the present invention, provided is a server device that processes event data related to an activity executed by a plurality of players, the device including an event data recording unit that records the event data related to the activity executed by the plurality of players, a play time acquisition unit that acquires a play time of the activity by the plurality of players from event data indicating a start of the activity and event data indicating an end of the activity that are recorded in the event data recording unit, a distribution generation unit that divides the plurality of players who have executed the activity into a plurality of groups according to the play time, a class sorting unit that sorts a player into any one of a plurality of classes according to a skill value of the player, a percentage derivation unit that derives a percentage occupied by the players of each class in each of the plurality of groups, and a type determination unit that determines a type of the activity on the basis of the derived percentage.

According to another aspect of the present invention, provided is a method for processing event data related to an activity executed by a plurality of players, the method including a step of sorting a player into any one of a plurality of classes according to a skill value of the player, a step of acquiring a play time of the activity by the plurality of players from event data indicating a start of the activity and event data indicating an end of the activity, a step of dividing the plurality of players who have executed the activity into a plurality of groups according to the play time, a step of deriving a percentage occupied by the players of each class in each of the plurality of groups, and a step of determining a type of the activity on the basis of the derived percentage.

It should be noted that any combination of the above constitutional elements, or any transformation of the expression of the present invention among methods, devices, systems, recording media, computer programs, and the like is also valid as an aspect of the present invention.

BRIEF DESCRIPTION OF DRAWINGS

FIG. 7 depict diagrams of a distribution curve representing a relation between the play time of an activity and the number of players who executed the activity.

FIG. 8 depict diagrams of the distribution of the play time.

DESCRIPTION OF EMBODIMENT

An outline of the present invention will be described. In an embodiment, an information processing device executes game software. When starting an activity, the game software outputs to system software an activity identifier (activity ID) identifying the activity and event information including information indicating the start of the activity. The activity is a unit of game play and may be a quest or a mission provided to a user in the progress of the game. When ending the activity, the game software outputs to the system software the activity ID and event information including information indicating the end of the activity. At the end of the activity, the game software may include a result (success or failure) of the activity in the event information. The system software generates event data in which a game identifier (game ID) identifying the game and time information (time stamp) are added to the event information output from the game software, and transmits the data to a server device.

The server device collects the event data transmitted from a plurality of information processing devices operated by a plurality of players to analyze play trends related to the activity. In particular, the server device of the embodiment statistically processes the play time of the activity by the plurality of players on the basis of the event data transmitted from the plurality of information processing devices. The server device has a function of notifying users who have not yet played the activity of a predicted play time on the basis of the statistically-processed result.

Figure 1:
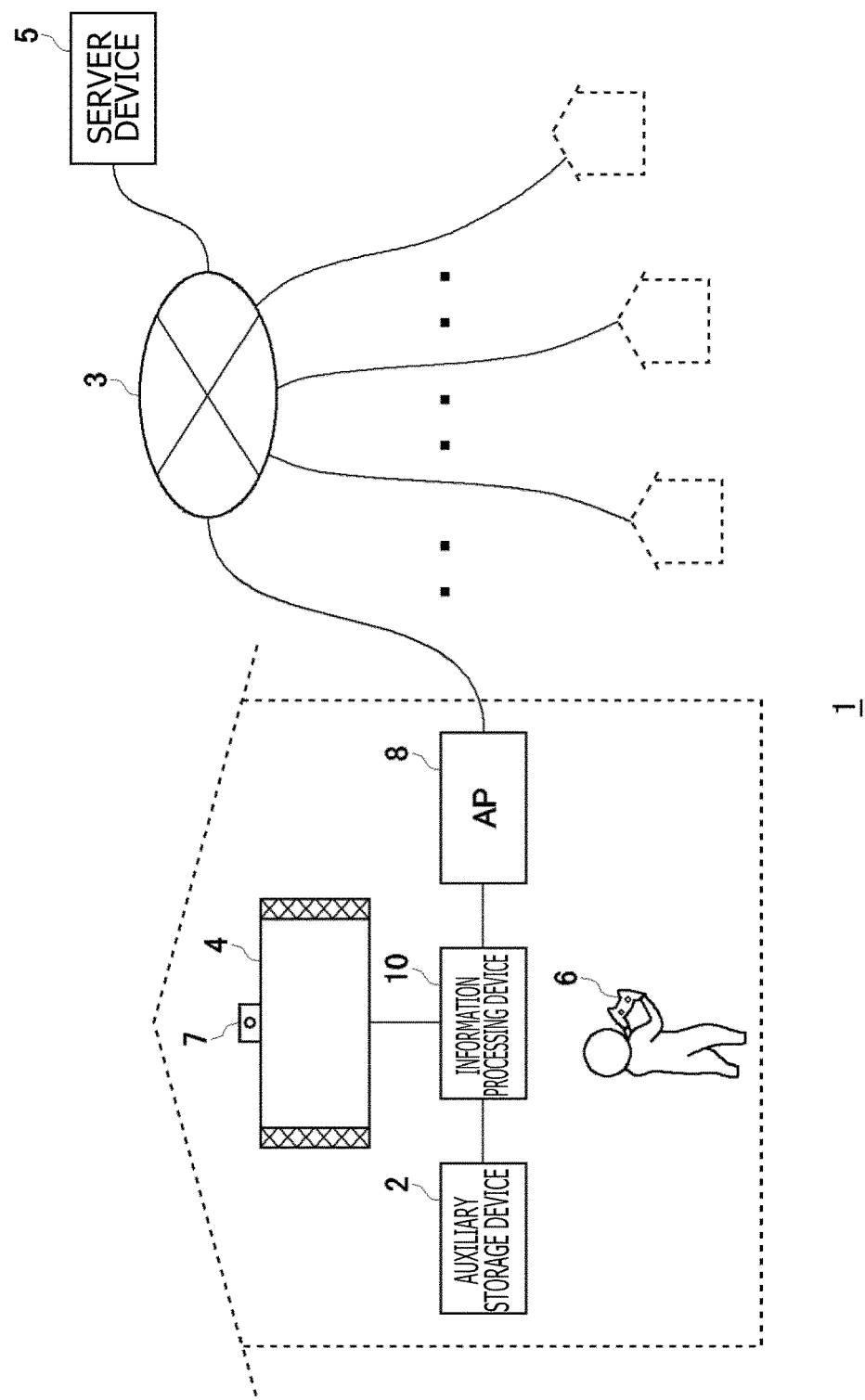
FIG. 1 is a diagram for depicting an information processing system according to an embodiment.

FIG. 1 depicts an information processing system 1 according to the embodiment of the present invention. The information processing system 1 of the embodiment is a play time analysis system that analyzes the play time of an activity and includes an information processing device 10 operated by a user and a server device 5. An access point (hereinafter, referred to as "AP") 8 has functions of a wireless access point and a router, and the information processing device 10 is connected to the AP 8 wirelessly or via a wire to be communicable with the server device 5 on a network 3. Although one user and one information processing device 10 are depicted in FIG. 1, the information processing system 1 assumes that a plurality of information processing devices 10 operated by a plurality of users and the server device 5 are connected to each other via the network 3.

The information processing device 10 is connected to an input device 6 operated by the user in a wireless or wired manner, and the input device 6 outputs information operated by the user to the information processing device 10. When the information processing device 10 receives the operation information from the input device 6, the information is reflected in the processes of the system software and the game software, and the processing result is output from an output device 4. In the information processing system 1, the information processing device 10 may be a game device (game console) that executes a game, and the input device 6 may be a device that supplies the operation information of the user to the information processing device 10 such as a game controller. It should be noted that the input device 6 may be an input interface such as a keyboard or a mouse.

An auxiliary storage device 2 is a large-capacity recording device such as an HDD (hard disk drive) or an SSD (solid state drive), and may be a built-in recording device, or an external recording device connected to the information processing device 10 via a USB (Universal Serial Bus) or the like. The output device 4 may be a television having a display that outputs images and a speaker that outputs voice. The output device 4 may be connected to the information processing device 10 via a wired cable or may be connected wirelessly.

A camera 7, which is an imaging device, is provided near the output device 4 and images the space around the output device 4. Although FIG. 1 depicts an example in which the camera 7 is attached to an upper part of the output device 4, it may be arranged at a side or lower part of the output device 4, and in any case, it is arranged at a position where the user positioned in front of the output device 4 can be imaged. The camera 7 may be a stereo camera.

The server device 5 provides network services to the user of the information processing system 1. The server device 5 manages a network account for identifying each user, and each user signs in the network services provided by the server device 5 by using the network account. The user can register saved data of the game and trophies, which are virtual prizes earned during the game play, in the server device 5 by signing in the network services from the information processing device 10. By registering the saved data and trophies in the server device 5, the user can synchronize the saved data and trophies even when using an information processing device different from the information processing device 10.

The server device 5 of the embodiment collects the event data from the plurality of information processing devices 10 operated by the plurality of players. The server device 5 statistically processes the play time of the activity from the collected event data, and evaluates the play time corresponding to a player skill value for each activity. In addition, the server device 5 derives the player skill value of the user from the collected event data. On the basis of the play time corresponding to the player skill value of the activity and the player skill value of the user, the server device 5 can notify users who have not yet executed the activity of the play time corresponding to the player skill value of the user as the predicted play time. When the users are notified of the predicted play time, it is possible to determine whether or not to play the activity on the basis of their situations (for example, they have to go out in an hour, or the like).

Figure 2:
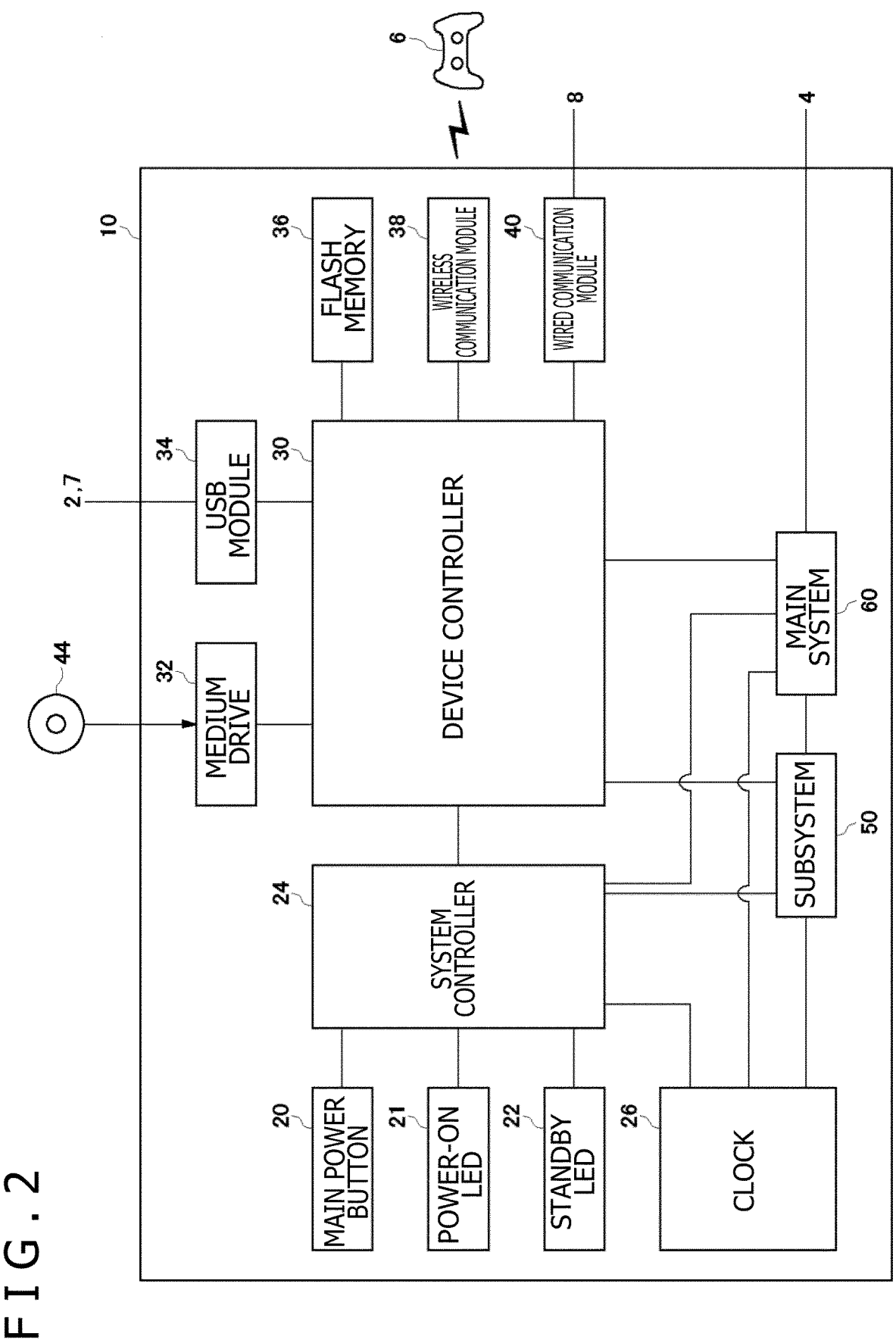
FIG. 2 is a diagram for depicting a hardware configuration of an information processing device.

FIG. 2 depicts a hardware configuration of the information processing device 10. The information processing device 10 has a main power button 20, a power-on LED 21, a standby LED 22, a system controller 24, a clock 26, a device controller 30, a medium drive 32, a USB module 34, a flash memory 36, a wireless communication module 38, a wired communication module 40, a subsystem 50, and a main system 60.

The main system 60 includes a main CPU (Central Processing Unit), a memory as a main storage device, a memory controller, a GPU (Graphics Processing Unit), and the like. The GPU is mainly used for arithmetic processes of game programs. The main CPU activates the system software and has a function of executing the game program installed in the auxiliary storage device 2 under the environment provided by the system software. The subsystem 50 includes a sub-CPU, a memory as a main storage device, a memory controller, and the like, and does not include a GPU.

While the main CPU has a function of executing the game program installed in the auxiliary storage device 2, the sub-CPU does not have such a function. However, the sub-CPU has a function of accessing the auxiliary storage device 2 and a function of transmitting and receiving data to/from the server device 5. The sub-CPU is configured to have only such limited processing functions and can be therefore operated at a low power consumption as compared with the main CPU. These functions of the sub-CPU are executed when the main CPU is in a standby state.

The main power button 20 is an input unit where operation input from the user is performed, and is provided on the front surface of the housing of the information processing device 10, and is operated to turn on or off the power supply to the main system 60 of the information processing device 10. The power-on LED 21 is lighted when the main power button 20 is turned on, and the standby LED 22 is lighted when the main power button 20 is turned off. The system controller 24 detects the pressing of the main power button 20 by the user.

The clock 26 is a real-time clock that generates current date and time information and supplies the same to the system controller 24, the subsystem 50, and the main system 60.

The device controller 30 is configured as an LSI (Large-Scale Integrated Circuit) that transfers information between devices like a south bridge. As illustrated in the drawing, the devices such as the system controller 24, the medium drive 32, the USB module 34, the flash memory 36, the wireless communication module 38, the wired communication module 40, the subsystem 50, and the main system 60 are connected to the device controller 30. The device controller 30 absorbs the difference in the electrical characteristics of each device and the difference in the data transfer speed to control the timing of the data transfer.

The medium drive 32 is a drive device that is driven by loading application software such as a game and a ROM medium 44 on which license information is recorded, and reads programs and data from the ROM medium 44. The ROM medium 44 is a read-only recording medium such as an optical disk, a magneto-optical disk, or a Blu-ray disk.

The USB module 34 is a module that is connected to external devices via a USB cable. The USB module 34 may be connected to the auxiliary storage device 2 and the camera 7 via a USB cable. The flash memory 36 is an auxiliary storage device configuring the internal storage. The wireless communication module 38 wirelessly communicates with the input device 6 by using a communication protocol such as the Bluetooth (registered trademark) protocol or the IEEE (Institute of Electrical and Electronics) 802.11 protocol. The wired communication module 40 communicates with external devices in a wired manner and is connected to the network 3 via the AP 8.

Figure 3:
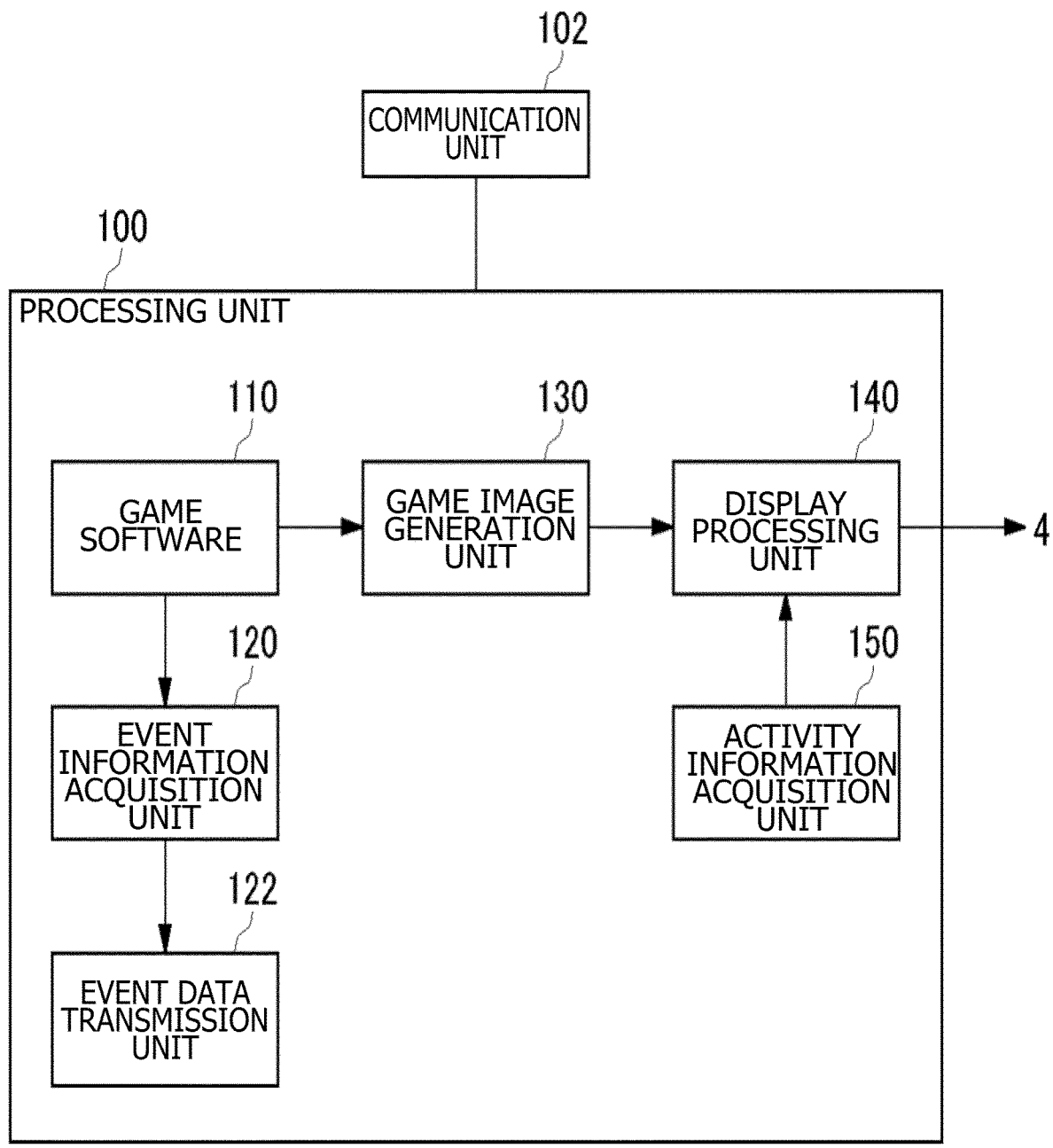
FIG. 3 is a diagram for depicting functional blocks of the information processing device.

FIG. 3 depicts functional blocks of the information processing device 10. The information processing device 10 includes a processing unit 100 and a communication unit 102. The processing unit 100 includes game software 110, an event information acquisition unit 120, an event data transmission unit 122, a game image generation unit 130, a display processing unit 140, and an activity information acquisition unit 150.

Each element described in FIG. 3 as a functional block that performs various processes of the information processing device 10 can be configured by using a circuit block, a memory, or other LSIs in terms of hardware, and can be realized by a program or the like loaded in the memory in terms of software. Therefore, it is understood by those skilled in the art that these functional blocks can be realized in various forms by hardware alone, software alone, or a combination thereof, and are not limited to any of these.

The game software 110 includes at least game programs, image data, and voice data. The game program receives the operation information of the input device 6 by the user and performs arithmetic processes to move a game character in a virtual space. The game image generation unit 130 includes a GPU (Graphics Processing Unit) that executes a rendering process and the like to generate image data of the game. The display processing unit 140 outputs the generated game image from the output device 4. It should be noted that the processing unit 100 includes a game voice generation unit for generating game voice data and a voice output unit for outputting game voice, which are not illustrated in FIG. 3.

When starting an activity in the progress of the game, the game program outputs event information indicating the occurrence of a start event of the activity, and when ending the activity, the game program outputs event information indicating the occurrence of an end event of the activity. When the event information is acquired from the game software 110, the event information acquisition unit 120 generates event data in which the game ID and time information (time stamp) indicating the time when the event occurred are added to the event information, and provides the same to the event data transmission unit 122. It should be noted that the game program may output the event information including the game ID and/or the time stamp to the event information acquisition unit 120. The event data transmission unit 122 transmits the generated event data to the server device 5 via the communication unit 102.

The game developer may build various activities into the game. For example, in the case where a battle activity with an enemy boss is incorporated into the game, the game program outputs an activity ID that identifies the battle activity and event information that includes information indicating the start of the battle activity at the start of the battle. When the player wins the battle with the enemy boss, the game program outputs the activity ID that identifies the battle activity and event information that includes information indicating the end of the battle activity and information indicating the success of the activity.

The event data transmission unit 122 transmits event data related to the activity executed by the player to the server device 5 via the communication unit 102. In the information processing system 1, the transmission process of the event data is performed by all the information processing devices 10 connected to the server device 5, and the server device 5 collects event data related to various activities of various games from the plurality of information processing devices 10. It is preferable that when acquiring the event information from the game software 110, the event information acquisition unit 120 immediately generates event data with a time stamp added, and the event data transmission unit 122 transmits the same to the server device 5.

Figure 4:
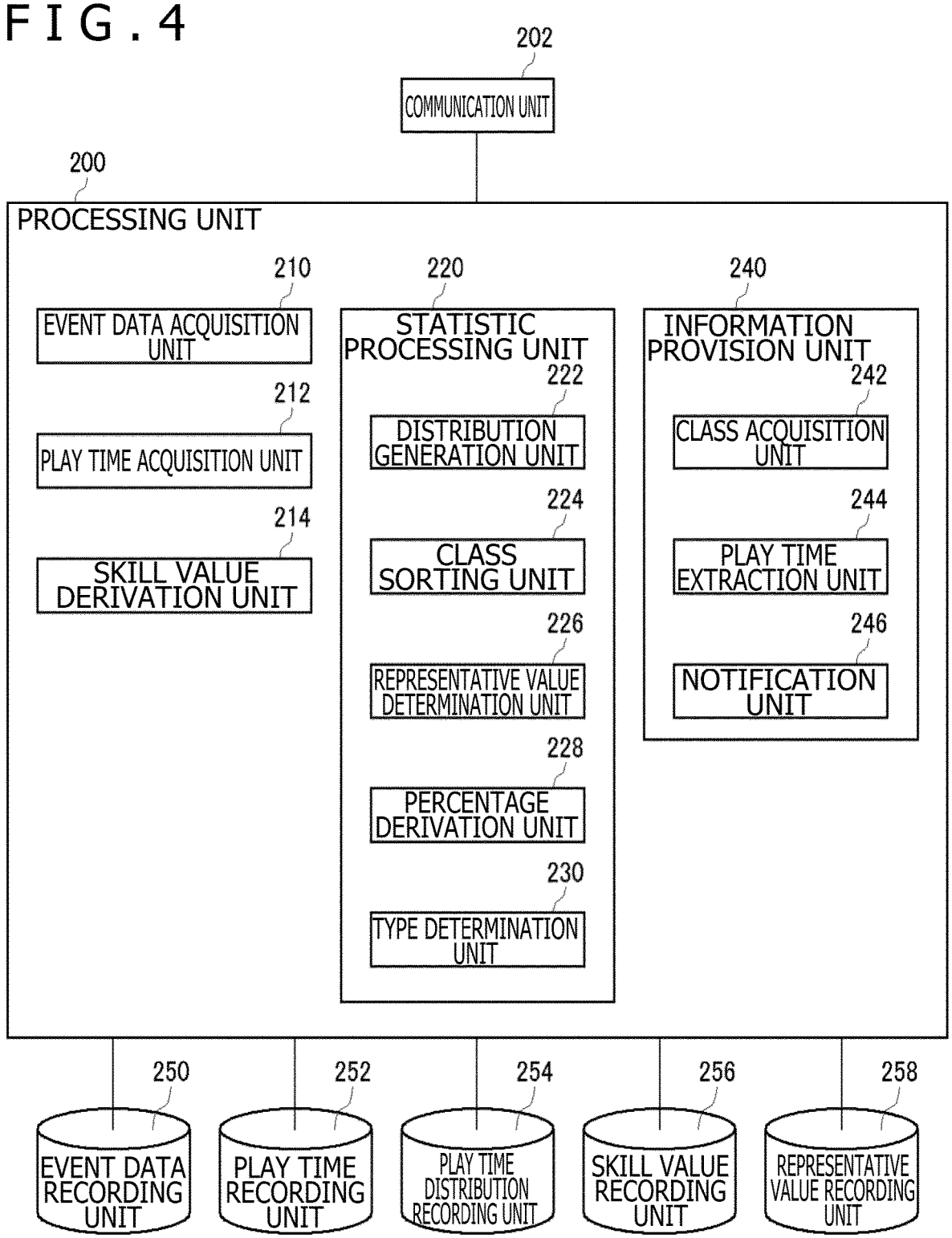
FIG. 4 is a diagram for depicting functional blocks of a server device.

FIG. 4 depicts functional blocks of the server device 5 of the embodiment. The server device 5 includes a processing unit 200, a communication unit 202, an event data recording unit 250, a play time recording unit 252, a play time distribution recording unit 254, a skill value recording unit 256, and a representative value recording unit 258. The processing unit 200 includes an event data acquisition unit 210, a play time acquisition unit 212, a skill value derivation unit 214, a statistic processing unit 220, and an information provision unit 240. The statistic processing unit 220 has a distribution generation unit 222, a class sorting unit 224, a representative value determination unit 226, a percentage derivation unit 228, and a type determination unit 230. The information provision unit 240 has a class acquisition unit 242, a play time extraction unit 244, and a notification unit 246.

Each element described in FIG. 4 as a functional block that performs various processes of the server device 5 can be configured using a circuit block, a memory, or other LSIs in terms of hardware, and can be realized by a program or the like loaded in the memory in terms of software. Therefore, it is understood by those skilled in the art that these functional blocks can be realized in various forms by hardware alone, software alone, or a combination thereof, and are not limited to any of these.

The event data acquisition unit 210 acquires event data related to the activities executed by a plurality of players from a plurality of information processing devices 10, and records the same in the event data recording unit 250. The event data recording unit 250 records the event data for each game title while being associated with the network account of the player. As mentioned above, the event data includes at least the game ID, the activity ID, the information indicating the start or end of the activity, and the time stamp. Hereinafter, a procedure for analyzing the collected event data by the server device 5 will be described.

Figure 5:
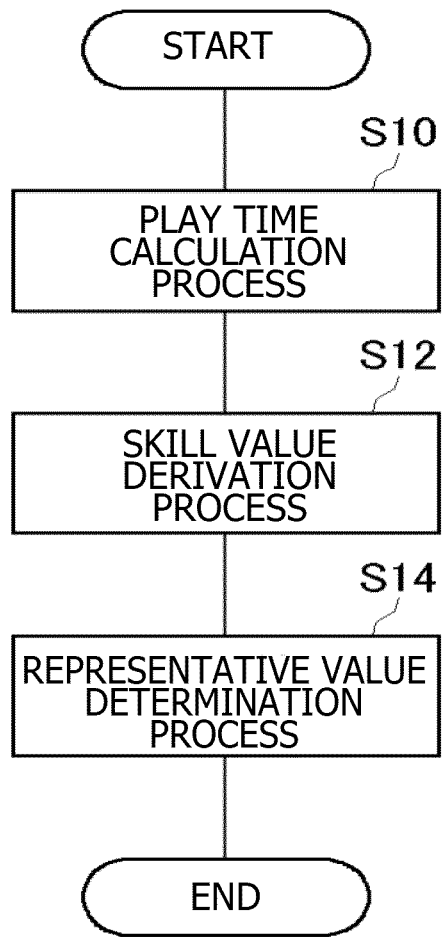
FIG. 5 is a diagram for depicting a procedure for analyzing collected event data.

FIG. 5 depicts the procedure for analyzing the collected event data. The analysis of the event data includes a play time calculation process (S10) by the play time acquisition unit 212, a skill value derivation process (S12) by the skill value derivation unit 214, and a representative value determination process (S14) by the representative value determination unit 226.

<S10: Play Time Calculation Process>

The play time acquisition unit 212 acquires the play time of the activity. The play time acquisition unit 212 acquires the play time of the activity of a plurality of players from event data (start event data) including start event information of the activity and event data (end event data) including end event information of the activity, which are recorded in the event data recording unit 250. The play time of the activity is calculated on the basis of the time stamp included in the start event data and the time stamp included in the end event data.

Figure 6:
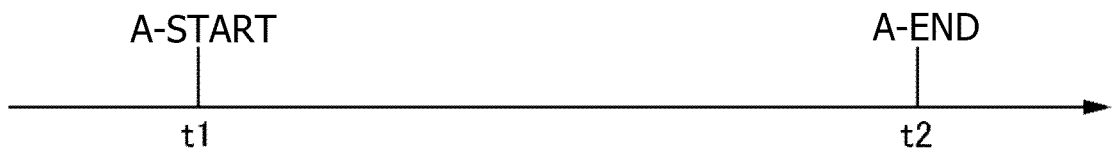
FIG. 6 is a diagram for explaining a method of calculating the play time.

FIG. 6 is a diagram for explaining a method of calculating the play time. FIG. 6 depicts the start event and end event of an activity A by a single player, and specifically, "A start" indicates the start event of the activity A and "A end" indicates the end event of the activity A. The start event data includes the start time t1 of the activity A, the end event data includes the end time t2 of the activity A, and the play time acquisition unit 212 calculates the play time as (t2−t1). The play time acquisition unit 212 associates the calculated play time of the activity with the network account of the player and records the same in the play time recording unit 252 together with the game ID and the activity ID.

<S12: Skill Value Derivation Process>

In the statistic processing unit 220, the distribution generation unit 222 generates the distribution of the play time for each activity on the basis of a plurality of play times acquired by the play time acquisition unit 212. The distribution generation unit 222 records the distribution of the play time generated for each activity in the play time distribution recording unit 254.

Each of FIG. 7(a) and FIG. 7(b) depicts a distribution curve representing the relation between the play time of one activity and the number of players who executed the activity. The horizontal axis depicts the play time and the vertical axis depicts the number of players. FIG. 7(a) depicts the relation between the play time of the activity A and the number of players, and FIG. 7(b) depicts the relation between the play time of an activity B and the number of players.

On the basis of the knowledge that the play time of an activity correlates with the game skill of the user, the server device 5 derives the skill value of the user and realizes a technology that notifies the user of the play time corresponding to the derived skill value. In this knowledge, a user with a high game skill completes the activity in a relatively short play time, while a user with a low game skill completes the activity in a relatively long play time. Therefore, it is predicted that if the game skill of the user is high, both the activity A and activity B are completed in a short play time, and if the game skill of the user is low, both the activity A and activity B are completed in a long play time.

Each of FIG. 8(a) and FIG. 8(b) depicts the distribution of the play time. For each activity, the distribution generation unit 222 arranges all the players in ascending order of play time and divides all the players into a plurality of groups so that the numbers of players included in the respective groups are equal to each other. In the embodiment, the distribution generation unit 222 divides all the players into 10 groups as groups 1 to 10, and the numbers of players included in the respective groups are the same. In the case where the number of players who played the activity A is one million, each group includes one hundred thousand players, and the group 1 is a group in which players with the shortest play time are collected and the group 10 is a group in which players with the longest play time are collected. The distribution generation unit 222 records the distribution of the play time generated for each activity in the play time distribution recording unit 254. For example, the play time distribution recording unit 254 may record as the distribution of the play time by associating the group numbers from 1 to 10 with the shortest play time and the longest play time included in each group.

The skill value derivation unit 214 derives the skill value of the user for the activity on the basis of the play time of the activity by the user and the distribution of the play time of the activity. The skill value derivation unit 214 derives the skill value of the user for the activity by referring to the play time distribution recorded in the play time distribution recording unit 254 and specifying the group number of the group including the play time of the user. In the embodiment, the group number may represent the skill value as it is. Therefore, the skill value derivation unit 214 derives the skill value of the user for the activity A as "3" if the play time of the user who executed the activity A is included in the group of the group number 3, and derives the skill value of the user for the activity B as "5" if the play time of the user who executed the activity B is included in the group of the group number 5.

The skill value derivation unit 214 derives a skill value related to the game play of the user on the basis of a plurality of skill values derived for a plurality of activities. Specifically, the skill value derivation unit 214 derives the skill value of the user for the plurality of activities executed most recently by the user, averages the plurality of derived skill values, and derives the skill value related to the game play of the user. In the embodiment, the skill value derivation unit 214 derives the skill value related to the game play of the user by averaging 10 skill values derived most recently for 10 activities. Hereinafter, the skill value related to the game play of the user will be referred to as "player skill value" in some cases.

A concrete example of deriving the player skill value of a user X is depicted below. It should be noted that the values indicated in the concrete example may include values that deviate from the above knowledge, but are merely values for explaining the embodiment.

The group numbers of the groups including the play times for 10 activities executed most recently by the user X are as follows.

| | |
|---|---|
| Activity A | Group Number 3 |
| Activity B | Group Number 5 |
| Activity C | Group Number 1 |
| Activity D | Group Number 2 |
| Activity E | Group Number 4 |
| Activity F | Group Number 7 |
| Activity G | Group Number 5 |
| Activity H | Group Number 5 |
| Activity I | Group Number 8 |
| Activity J | Group Number 10 |

Since the skill values are represented by the group numbers, the skill value of the user for each activity is derived as follows.

| | |
|---|---|
| Activity A | Skill Value 3 |
| Activity B | Skill Value 5 |

-continued

| | |
|---|---|
| Activity C | Skill Value 1 |
| Activity D | Skill Value 2 |
| Activity E | Skill Value 4 |
| Activity F | Skill Value 7 |
| Activity G | Skill Value 5 |
| Activity H | Skill Value 5 |
| Activity I | Skill Value 8 |
| Activity J | Skill Value 10 |

The skill value derivation unit 214 derives the player skill value of the user X by averaging the skill values derived for the 10 activities.

(Player Skill Value)=(3+5+1+2+4+7+5+5+8+10)/10=5

Thus, the player skill value of the user X is derived as "5" by averaging the skill values derived for the 10 activities.

The skill value derivation unit 214 derives the player skill values of all the users and records the same in the skill value recording unit 256. The player skill value takes a value in a range of a minimum value of 1 and a maximum value of 10. It can be said that the users with smaller player skill values are high in the game skill, and the users with larger player skill values are low in the game skill.

As described above, the skill value derivation unit 214 derives the player skill value on the basis of the skill values derived most recently for a predetermined number of activities. The skill value derivation unit 214 may update the player skill value of the user each time the user executes the activity, but may also update the player skill value periodically, for example, once a day.

<S14: Representative Value Determination Process>

In the statistic processing unit 220, the class sorting unit 224 sets a plurality of classes and sorts the player into any one of the plurality of classes according to the player skill value of the player. In the embodiment, the class sorting unit 224 sets 9 classes and performs the sorting process of the user according to the following rules. PS represents the player skill value.

| | |
|---|---|
| 1 ≤ PS ≤ 2 | Class 1 |
| 2 < PS ≤ 3 | Class 2 |
| 3 < PS ≤ 4 | Class 3 |
| 4 < PS ≤ 5 | Class 4 |
| 5 < PS ≤ 6 | Class 5 |
| 6 < PS ≤ 7 | Class 6 |
| 7 < PS ≤ 8 | Class 7 |
| 8 < PS ≤ 9 | Class 8 |
| 9 < PS ≤ 10 | Class 9 |

The user X whose player score value described above is "5" is sorted into the class 4 by the class sorting unit 224. The class sorting unit 224 sorts all the users who participate in the information processing system 1 into any one of the classes 1 to 9 according to the player skill value, and records the class of each user in the skill value recording unit 256.

Figure 9:
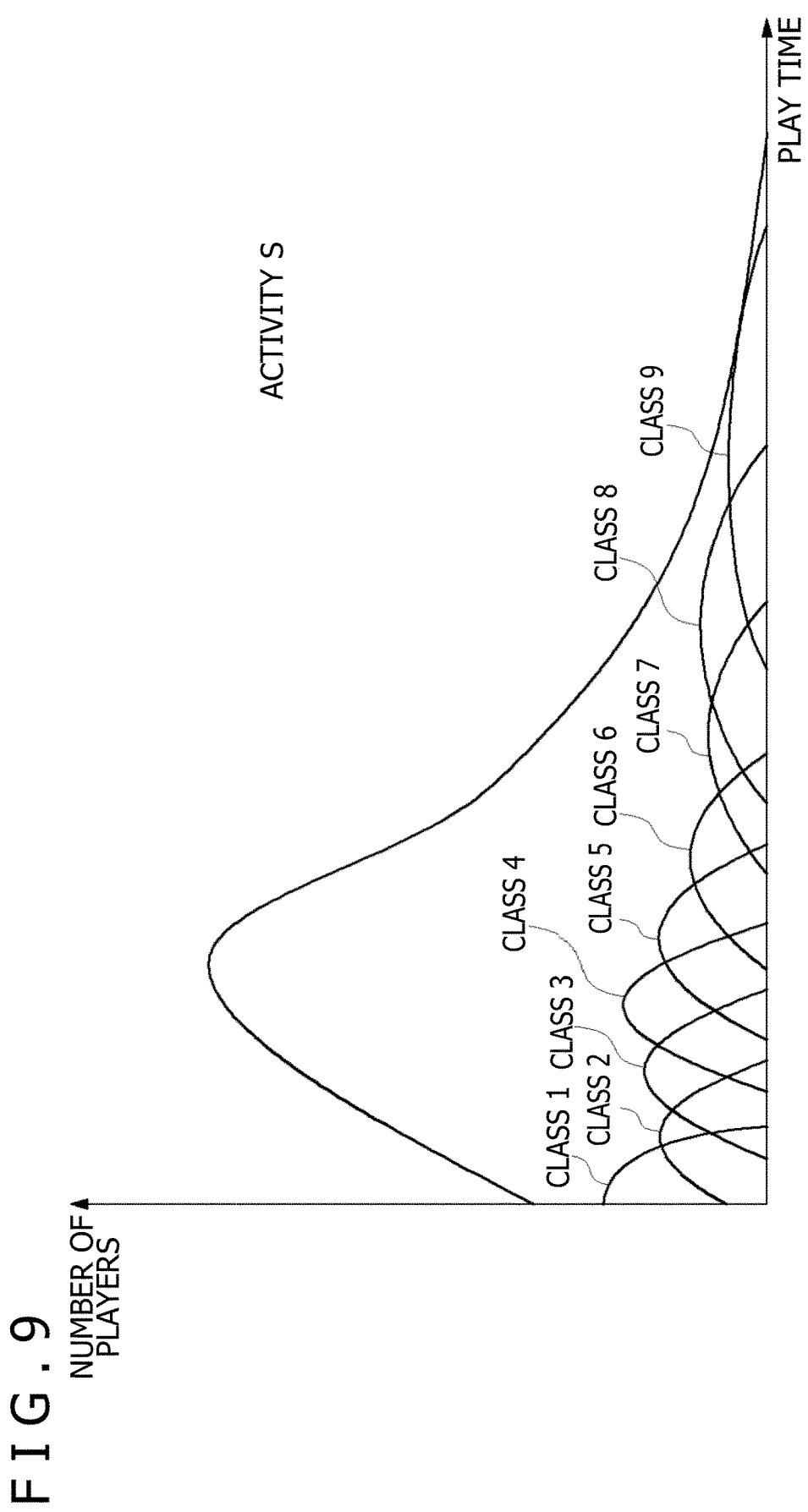
FIG. 9 is a diagram for depicting a graph in which players are plotted by class.

FIG. 9 depicts a graph plotting players by class in a distribution curve for depicting the relation between the play time and the number of players of an activity S. The graph of the class 1 depicts the relation between the play times of a plurality of players belonging to the class 1 and the number of players, and the graph of the class 2 depicts the relation between the play times of a plurality of players belonging to the class 2 and the number of players. That is, the graph of the class N (1 to 9) represents the relation between the play times of a plurality of players belonging to the class N and the number of players. Therefore, when the graphs of all the classes 1 to 9 are combined, the distribution curve depicts the relation between the play times of all the users of the activity S and the number of players. It should be noted that the number of players belonging to each class may be different.

For each activity, the representative value determination unit 226 determines the representative value of the play time in each class on the basis of the play times of a plurality of players in each class. The representative value determination unit 226 may derive a plurality of medians of the play times as the representative values of the respective classes. The representative value determination unit 226 determines the representative value (med N) of the play time in each class as follows.

| | |
|---|---|
| Class 1 | med 1 |
| Class 2 | med 2 |
| Class 3 | med 3 |
| Class 4 | med 4 |
| Class 5 | med 5 |
| Class 6 | med 6 |
| Class 7 | med 7 |
| Class 8 | med 8 |
| Class 9 | med 9 |

The representative value of the play time determined for each class may be provided as the predicted play time for users who have not yet executed the activity. In the case where the user X belonging to the class 4 has not yet executed the activity S, the server device 5 can notify the user X of that the predicted play time when playing the activity S is "med 4."

For all the activities, the representative value determination unit 226 determines the representative values of the respective classes 1 to 9, associates the classes with the representative values, and records the same in the representative value recording unit 258. In the embodiment, the representative value is the median, but may be a mean value or a mode value. The representative value determination unit 226 may perform the representative value determination process periodically, for example, once a day. The above is the explanation of the analysis process of the event data in the embodiment.

The information provision unit 240 notifies the user operating the information processing device 10 of the predicted play time of the activity that the user has not yet executed. Specifically, the information provision unit 240 notifies the user of the representative value of the play time associated with the class of the user or the time on the basis of the representative value as the predicted play time. The information provision unit 240 may notify the predicted play time at any timing.

The class acquisition unit 242 acquires, from the skill value recording unit 256, the class to which the user operating the information processing device 10 belongs. For example, when the user logs in the information processing device 10, the class acquisition unit 242 may acquire the class to which the user who logged in belongs from the skill value recording unit 256. The play time extraction unit 244 extracts, from the representative value recording unit 258, the representative value of the play time associated with the class of the user with respect to the activity that the user can execute. The notification unit 246 notifies the information processing device 10 of the user of information related to the predicted play time on the basis of the extracted representative value of the play time. It should be noted that the predicted play time on the basis of the representative value of the play time may be the representative value of the play time itself, but may be the time when the representative value of the play time is slightly adjusted. For example, in the case where the representative value of the play time is 4.9 minutes, the notification unit 246 may use a round time (for example, 5 minutes) as the predicted play time. The notification unit 246 may notify the information processing device 10 of the user of information related to the predicted play times of a plurality of activities.

In the information processing device 10, the activity information acquisition unit 150 acquires information related to the predicted play time of the activity from the server device 5. The display processing unit 140 displays the information acquired by the activity information acquisition unit 150.

Figure 10:
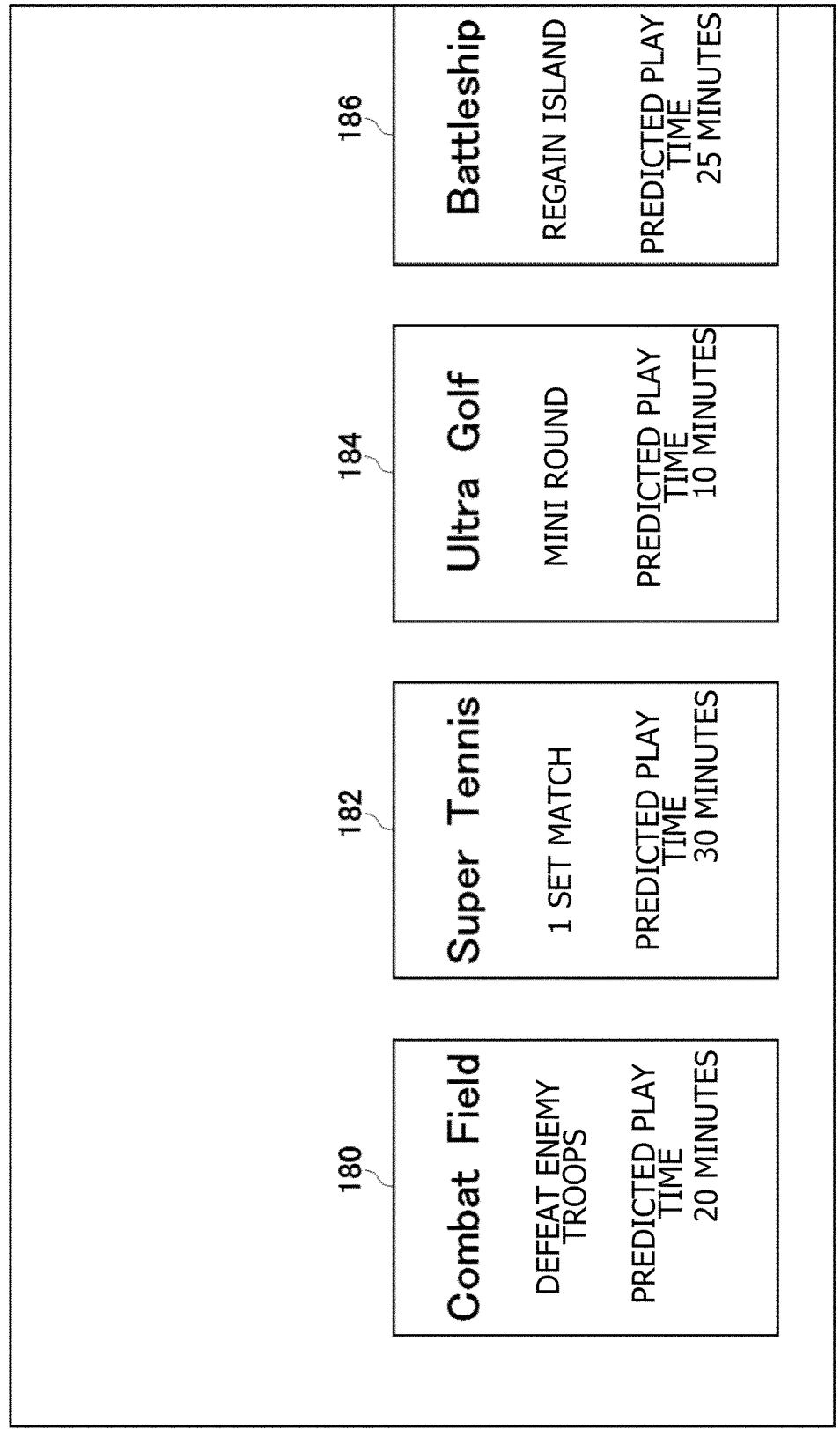
FIG. 10 is a diagram for depicting an example of a system screen.

FIG. 10 depicts an example of a system screen displayed on the output device 4. The display processing unit 140 generates system images 180, 182, 184, and 186 from the information acquired by the activity information acquisition unit 150 and displays the same on the output device 4. The four system images 180, 182, 184, and 186 display the predicted play times of the activities for game titles that are different from each other. Accordingly, the user can determine which game to play from the predicted play time of each activity.

The system images 180, 182, 184, and 186 displayed in card form may be GUIs (graphical user interfaces), and for example, when the user selects any one of the system images, the game corresponding to the system image may be automatically activated.

In the above embodiment, the skill value derivation unit 214 derives the skill value of the user for each activity on the assumption that a user with a high game skill completes the activity in a relatively short play time while a user with a low game skill completes the activity in a relatively long play time. This assumption can be applied to most activities.

However, this assumption cannot be applied to some activities. For example, in an activity in which a player character runs away from a zombie and aims to survive, the play time becomes longer as the game skill of a user becomes higher, while the play time becomes shorter as the game skill of a user becomes lower. Therefore, as the types of activities, activities in which the play time becomes shorter as the player skill value of a user becomes higher and activities in which the play time becomes longer as the player skill value of a user becomes higher are mixed. The statistic processing unit 220 of the embodiment has a function of determining the type of activity on the basis of the distribution of the play time to the player skill value.

Figure 11:
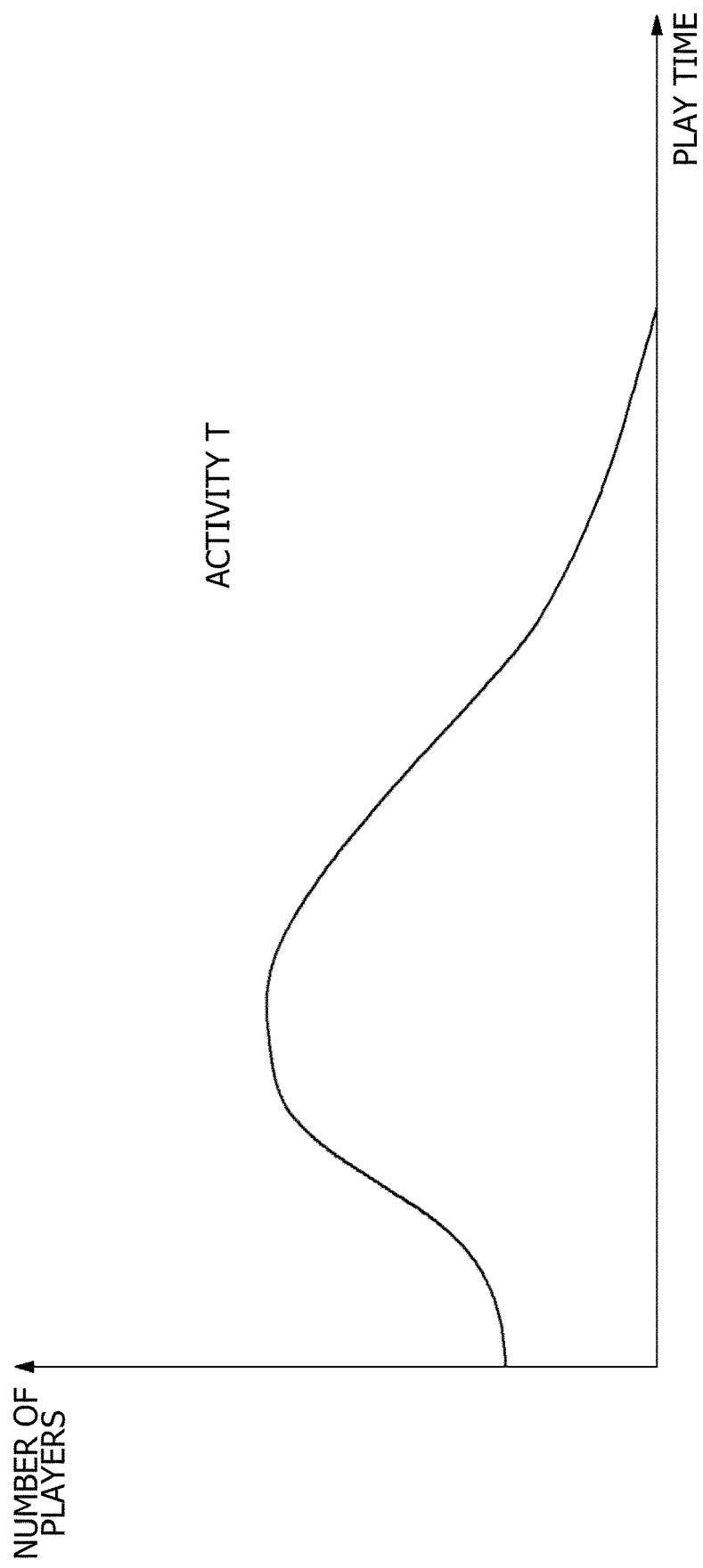
FIG. 11 is a diagram for depicting a distribution curve representing the relation between the play time of an activity and the number of players.

FIG. 11 depicts a distribution curve representing the relation between the play time of an activity T and the number of players who executed the activity T. Here, the activity T is a type of activity in which the play time becomes shorter as the player skill value of a user becomes higher.

Figure 12:
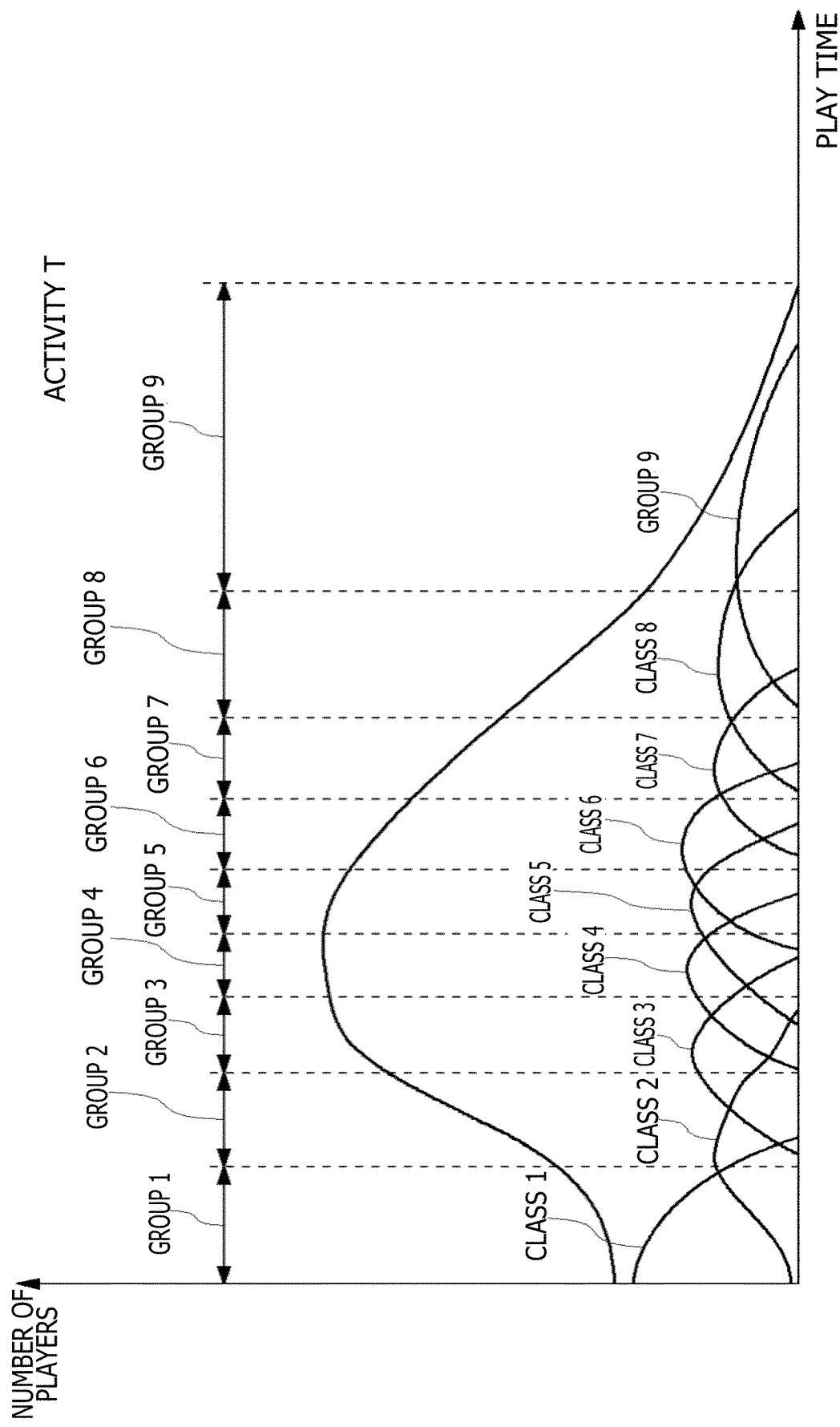
FIG. 12 is a diagram for depicting the distribution of the play time.

FIG. 12 depicts the distribution of the play time in the activity T. The distribution generation unit 222 arranges all the players who executed the activity T in ascending order of play time and divides all the players into a plurality of groups so that the numbers of players included in the respective groups are equal to each other. In the embodiment, the distribution generation unit 222 divides all the players into groups, the number of which is the same as the number of classes, according to the play time. Since the number of classes is "9," the distribution generation unit 222 divides all the players into 9 groups 1 to 9. The distribution generation unit 222 generates the distribution of the play time by arranging the players in ascending order of play time and separating the groups by the number (total players/9).

Further, the distribution generation unit 222 obtains the distribution of the play time for each class by plotting the players for each class in the distribution curve of the play time in the activity T. The graph of the class 1 depicts the relation between the play times of a plurality of players belonging to the class 1 and the number of players, and the graph of the class 2 depicts the relation between the play times of a plurality of players belonging to the class 2 and the number of players. That is, the graph of the class N (1 to 9) represents the relation between the play times of a plurality of players belonging to the class N and the number of players. Therefore, when the graphs of all the classes 1 to 9 are combined, the distribution curve depicts the relation between the play times of all the users of the activity T and the number of players.

As depicted in FIG. 12, in the type of activity T in which the play time becomes shorter as the player skill value of the user becomes higher, the range of the play time in the group N and the range of the play time in the class N tend to overlap.

Figure 13:
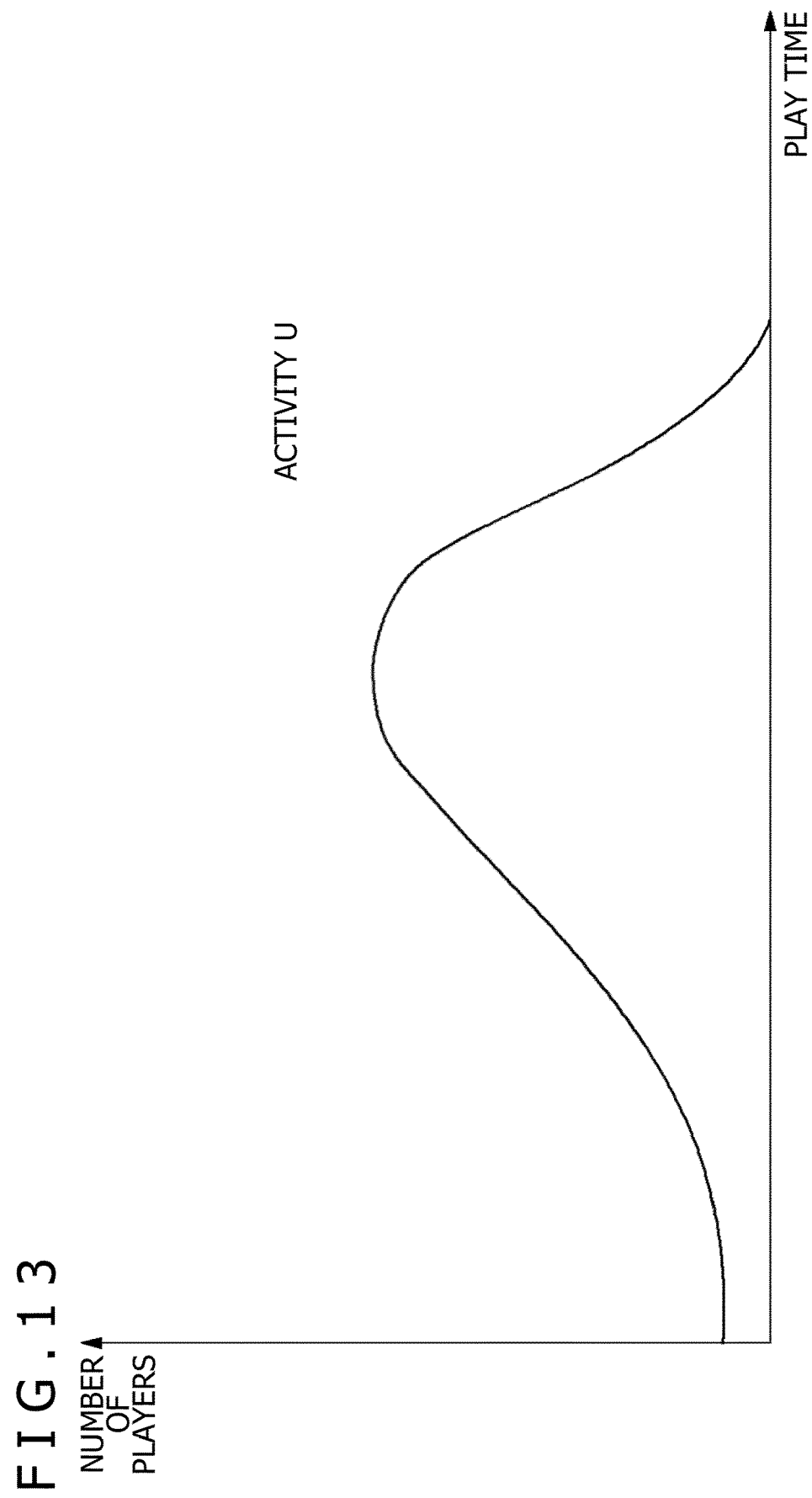
FIG. 13 is a diagram for depicting a distribution curve representing the relation between the play time of an activity and the number of players.

FIG. 13 depicts a distribution curve representing the relation between the play time of an activity U and the number of players who executed the activity U. Here, the activity U is a type of activity in which the play time becomes longer as the player skill value of a user becomes higher.

Figure 14:
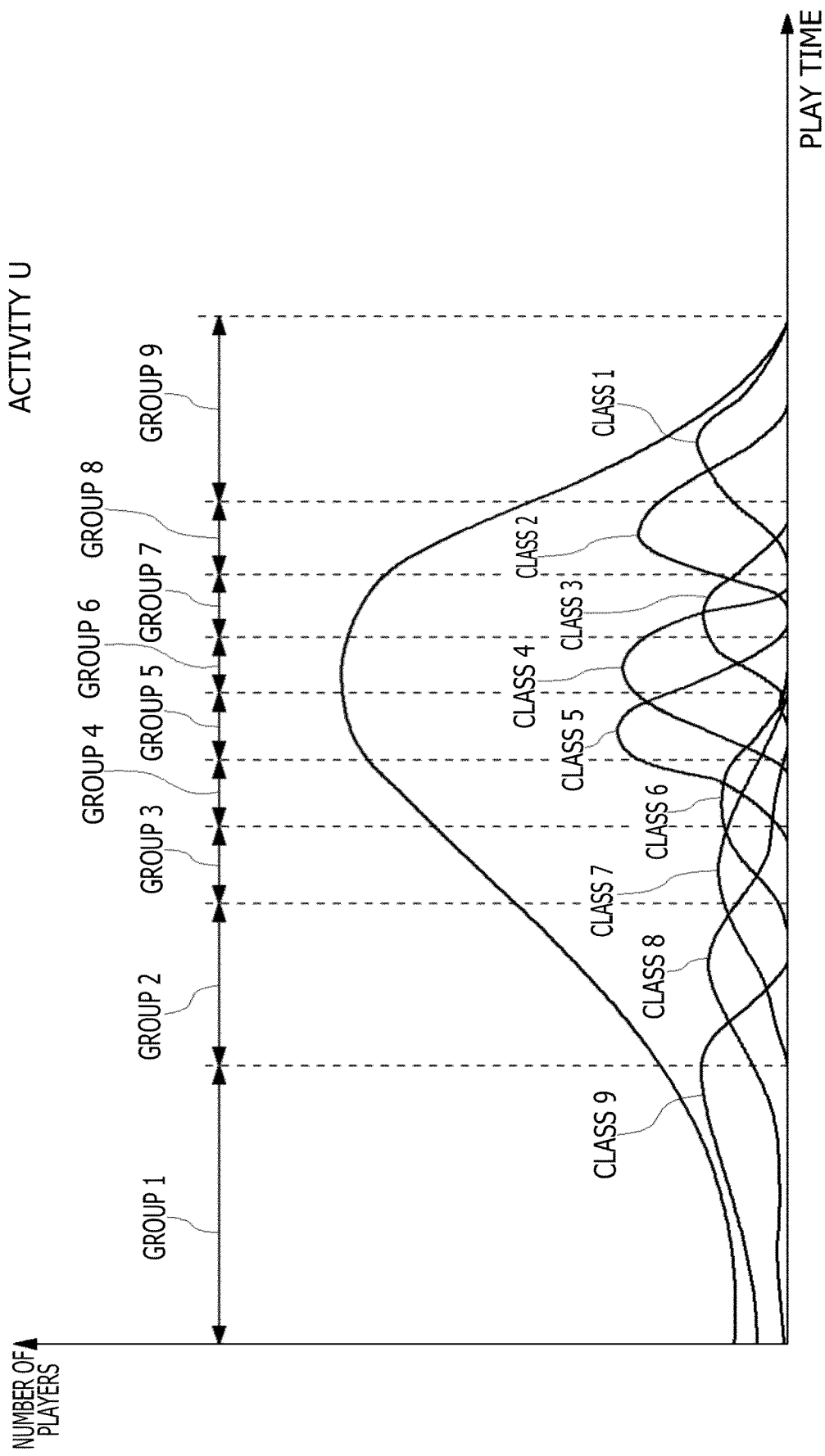
FIG. 14 is a diagram for depicting the distribution of the play time.

FIG. 14 depicts the distribution of the play time in the activity U. The distribution generation unit 222 arranges all the players who executed the activity U in ascending order of play time and divides all the players into a plurality of groups so that the numbers of players included in the respective groups are equal to each other. The distribution generation unit 222 divides all the players into groups, the number of which is the same as the number of classes, according to the play time. Since the number of classes is "9," the distribution generation unit 222 divides all the players into 9 groups 1 to 9. The distribution generation unit 222 generates the distribution of the play time by arranging the players in ascending order of play time and separating the groups by the number (total players/9).

Further, the distribution generation unit 222 obtains the distribution of the play time for each class by plotting the players for each class in the distribution curve of the play time in the activity U. The graph of the class 1 depicts the relation between the play times of a plurality of players belonging to the class 1 and the number of players, and the graph of the class 2 depicts the relation between the play times of a plurality of players belonging to the class 2 and the number of players. That is, the graph of the class N (1 to 9) represents the relation between the play times of a plurality of players belonging to the class N and the number of players. Therefore, when the graphs of all the classes 1 to 9 are combined, the distribution curve depicts the relation between the play times of all the users of the activity U and the number of players.

As depicted in FIG. 14, in the type of activity U in which the play time becomes longer as the player skill value of the user becomes higher, the range of the play time in the group N and the range of the play time in the class (10-N) tend to overlap.

With reference to FIG. 12 and FIG. 14, the distribution of the play time for each class differs depending on the difference in the type of activity. By using this, the statistic processing unit 220 determines the type of activity through arithmetic processes indicated below.

First, the percentage derivation unit 228 derives the percentage occupied by the players of each class in each of the plurality of groups. The percentage derivation unit 228 represents the percentage occupied by the players of a class i to the total number of players included in a group j as "$p_{ij}$" (1≤i and j≤9), and generates a class percentage matrix P.

$$P = \begin{pmatrix} p_{11} & p_{12} & \cdots & p_{19} \\ p_{21} & p_{22} & & p_{29} \\ \vdots & & \ddots & \\ p_{91} & & & p_{99} \end{pmatrix} \quad \text{[Math. 1]}$$

$$0 \le p_{ij} \le 1$$

In the type of activity T (see FIG. 12) in which the play time becomes shorter as the player skill value of the user becomes higher, the range of the play time in the group N and the range of the play time in the class N tend to overlap. Therefore, in the group j, the percentage $p_{ij}$ when i=j becomes a relatively large value, and in the class percentage matrix P, the diagonal elements $p_{11}$, $p_{22}$, $p_{33}$, $p_{44}$, $p_{55}$, $p_{66}$, $p_{77}$, $p_{88}$, and $p_{99}$ on the main diagonal indicate relatively large values with respect to the other elements.

On the other hand, in the type of activity U (see FIG. 14) in which the play time becomes longer as the player skill value of the user becomes higher, the range of the play time in the group N and the range of the play time in the class (10–N) tend to overlap. Therefore, in the group j, the percentage $p_{(10-j)j}$ when i=10−j becomes a relatively large value, and in the class proportion matrix P, the anti-diagonal elements $p_{91}$, $p_{82}$, $p_{73}$, $p_{64}$, $p_{46}$, $p_{37}$, $p_{28}$, and $p_{19}$ on the anti-diagonal from the lower left to the upper right indicate relatively large values with respect to the other elements.

The type determination unit 230 determines the type of activity on the basis of the percentage derived by the percentage derivation unit 228. First, the type determination unit 230 defines column vectors $p_1$, $p_2$, $p_3$, $p_4$, $p_5$, $p_6$, $p_7$, $p_8$ and $p_9$ from the class percentage matrix P.

$$P = \begin{pmatrix} \boxed{\begin{matrix}p_1\\p_{11}\\p_{21}\\\vdots\\p_{91}\end{matrix}} & \boxed{\begin{matrix}p_2\\p_{12}\\p_{22}\\\\\end{matrix}} & \cdots & \boxed{\begin{matrix}p_9\\p_{19}\\p_{29}\\\\p_{99}\end{matrix}} \end{pmatrix} \quad \text{[Math. 2]}$$

Each column vector represents the percentage occupied by the players of each class in each group, and thus the sum of the 9 elements in each column vector is 1.

The type determination unit 230 sets a weight matrix W.

[Math. 3]

|   | $w_1$ | $w_2$ |   |   | ... |   |   |   | $w_9$ |
|---|---|---|---|---|---|---|---|---|---|
| W= | 4 | 3 | 2 | 1 | 0 | −1 | −2 | −3 | −4 |
|   | 3 | 4 | 3 | 2 | 0 | −2 | −3 | −4 | −3 |
|   | 2 | 3 | 4 | 3 | 0 | −3 | −4 | −3 | −2 |
|   | 1 | 2 | 3 | 4 | 0 | −4 | −3 | −2 | −1 |
|   | 0 | 0 | 0 | 0 | 0 | 0 | 0 | 0 | 0 |
|   | −1 | −2 | −3 | −4 | 0 | 4 | 3 | 2 | 1 |
|   | −2 | −3 | −4 | −3 | 0 | 3 | 4 | 3 | 2 |
|   | −3 | −4 | −3 | −2 | 0 | 2 | 3 | 4 | 3 |
|   | −4 | −3 | −2 | −1 | 0 | 1 | 2 | 3 | 4 |

The weight matrix W is used to actualize the features of the activity type from the elements included in the class percentage matrix P. The above weight matrix W is an example in which positive values are set to diagonal elements excluding the middle portions and negative values are set to anti-diagonal elements excluding the middle portions. It should be noted that as the diagonal element, the positive maximum value in the weight matrix W is set, and as the anti-diagonal element, the negative maximum value in the weight matrix W is set. The type determination unit 230 defines column vectors $w_1$, $w_2$, $w_3$, $w_4$, $w_5$, $w_6$, $w_7$, $w_8$, and $w_9$ from the weight matrix W.

The type determination unit 230 obtains a vector u from a vector $p_n$ and a vector $w_n$.

$$u = \begin{pmatrix} w_1 \cdot p_1 \\ w_2 \cdot p_2 \\ \vdots \\ w_9 \cdot p_9 \end{pmatrix} \quad \text{[Math. 4]}$$

By using the weight vector w, the type determination unit 230 calculates the inner product of the weight vector w and the vector u and multiplies a normalization coefficient c to calculate an index R.

$$w = \begin{pmatrix} 4 \\ 3 \\ 2 \\ 1 \\ 0 \\ 1 \\ 2 \\ 3 \\ 4 \end{pmatrix} \quad \text{[Math. 5]}$$

$$R = c\, w \cdot u \quad \text{[Math. 6]}$$

$$-1 \le R \le 1$$

The weight vector w has a vector value that more highly reflects the influence of both ends in the distribution of the play time, namely, the group 1 and the group 9 to the index R.

The type determination unit 230 determines the type of activity according to the value of the index R.

(1) In the Case of t≤R≤1

If the index R is equal to or larger than a threshold t, it means that, in the class percentage matrix P, the diagonal elements on the main diagonal indicate relatively large values with respect to the other elements. Therefore, the type determination unit 230 determines that the activity is of a type in which the play time becomes shorter as the player skill value of the player becomes higher. For example, the threshold t may be a positive predetermined value of 0.5 or smaller.

(2) In the Case of −1≤R≤−t

If the index R is equal to or smaller than a threshold −t, it means that in the class percentage matrix P, the anti-diagonal elements on the anti-diagonal indicate relatively large values with respect to the other elements. Therefore, the type determination unit 230 determines that the activity is of a type in which the play time becomes longer as the player skill value of the player becomes higher.

(3) In the Case of −t<R<t

In this case, the type determination unit 230 cannot determine the type of activity. It should be noted that by setting the threshold t to a positive predetermined value near 0, the type determination unit 230 may certainly determine the type.

The type of activity determined by the type determination unit 230 is used for the skill value derivation process (S12) by the skill value derivation unit 214. In the skill value derivation process described above, it is assumed that as the player skill value of the user becomes higher, the play time of the activity becomes shorter. Therefore, when the skill value derivation unit 214 refers to the play time distribution recorded in the play time distribution recording unit 254 and identifies the group number of the group including the play time of the user, the group number is used as the skill value as it is. However, in the case where the activity is of a type in which the play time becomes longer as the player skill value of the user becomes higher, it is not preferable to use the identified group number as the skill value as it is.

Accordingly, in the case where the activity is of a type in which the play time becomes longer as the player skill value of the user becomes higher, when the skill value derivation unit 214 refers to the play time distribution recorded in the play time distribution recording unit 254 and identifies the group number of the group including the play time of the user, the skill value is derived as (11-(group number)). Therefore, the skill value derivation unit 214 derives the skill value of the user for the activity as "8" if the play time of the user who executed the activity is included in the group of the group number 3, and derives the skill value of the user for the activity as "6" if the play time of the user who executed the activity is included in the group of the group number 5. By using the determination result of the type of activity, the skill value derivation unit 214 can accurately derive the skill value for the activity, and therefore, it is possible to obtain the player skill value with high accuracy.

The present invention has been described above on the basis of the embodiment. It is understood by those skilled in the art that the embodiment is illustrative, various modified examples are possible for combinations of each constitutional element and each processing process, and such modified examples are also within the scope of the present invention.

INDUSTRIAL APPLICABILITY

The present invention can be used in the technical field for processing event data related to game activities.

REFERENCE SIGNS LIST

1: Information processing system
5: Server device
10: Information processing device
100: Processing unit
102: Communication unit
110: Game software
120: Event information acquisition unit
122: Event data transmission unit
130: Game image generation unit
140: Display processing unit
150: Activity information acquisition unit
180, 182, 184, 186: System image
200: Processing unit
202: Communication unit
210: Event data acquisition unit
212: Play time acquisition unit
214: Skill value derivation unit
220: Statistic processing unit
222: Distribution generation unit
224: Class sorting unit
226: Representative value determination unit
228: Percentage derivation unit
230: Type determination unit
240: Information provision unit
242: Class acquisition unit
244: Play time extraction unit
246: Notification unit
250: Event data recording unit
252: Play time recording unit
254: Play time distribution recording unit
256: Skill value recording unit
258: Representative value recording unit

The invention claimed is:

1. A system comprising:
a server device configured to perform processing comprising:
acquiring, from a plurality of information processing apparatuses, event data wherein the event data is generated during execution of an activity by a plurality of players on the plurality of information processing apparatuses;
acquiring a play time of the activity by the plurality of players from data in the event data indicating a start of the activity and an end of the activity;
dividing the plurality of players who have executed the activity into a plurality of groups according to the play time;
sorting a player into any one of a plurality of classes according to a skill value of the player;
deriving a percentage occupied by players of each class in each of the plurality of groups;
determining a type of the activity on a basis of the derived percentage; and
providing the information processing apparatus of a user with notification information related to a type of activity based on the derived percentage.

2. The system according to claim 1, wherein determining whether or not the activity is an activity in which the play time becomes shorter as the skill value of the player becomes higher, or an activity in which the play time becomes longer as the skill value of the player becomes higher.

3. The system according to claim 1,
wherein the dividing the plurality of players into the plurality of groups so that numbers of players included in the groups are equal to each other.

4. The system according to claim 1,
wherein a number of groups is the same as a number of classes.

5. A method comprising:
acquiring, from a plurality of information processing apparatuses, event data, wherein the event data is generated during execution of an activity by a plurality of players on the plurality of information processing apparatuses;
sorting a player into any one of a plurality of classes according to a skill value of the player;
acquiring a play time of the activity by the plurality of players from event data indicating a start of the activity and event data indicating an end of the activity;
dividing the plurality of players who have executed the activity into a plurality of groups according to the play time;
deriving a percentage occupied by players of each class in each of the plurality of groups;

determining a type of the activity on a basis of the derived percentage; and providing the information processing apparatus of a user with notification information related to a type of activity based on the derived percentage.

6. A memory storing instructions which, when executed by a server apparatus, cause the server apparatus to perform processing comprising:

acquiring, from a plurality of information processing apparatuses, event data related to an activity executed by a plurality of players on the plurality of information processing apparatuses;

sorting a player into any one of a plurality of classes according to a skill value of the player;

acquiring a play time of the activity by the plurality of players from the event data indicating a start of the activity and event data indicating an end of the activity;

dividing the plurality of players who have executed the activity into a plurality of groups according to the play time;

deriving a percentage occupied by players of each class in each of the plurality of groups;

determining a type of the activity on a basis of the derived percentage; and providing the information processing apparatus of a user with notification information related to a type of activity based on the derived percentage.

* * * * *